Nov. 1, 1938.  H. E. DICK  2,134,812
VALVE HANDLE
Filed March 12, 1937
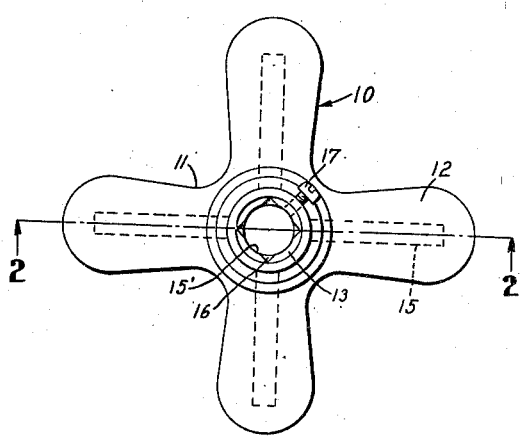
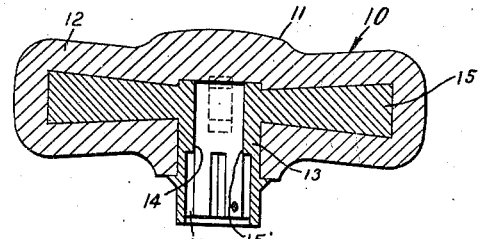
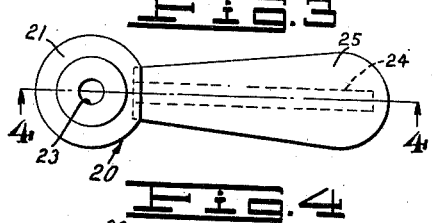
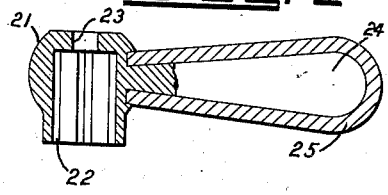
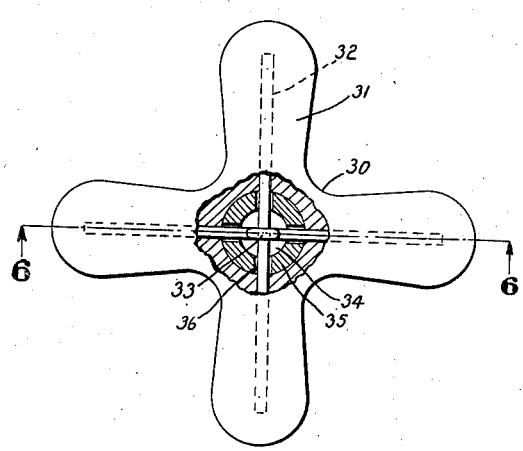
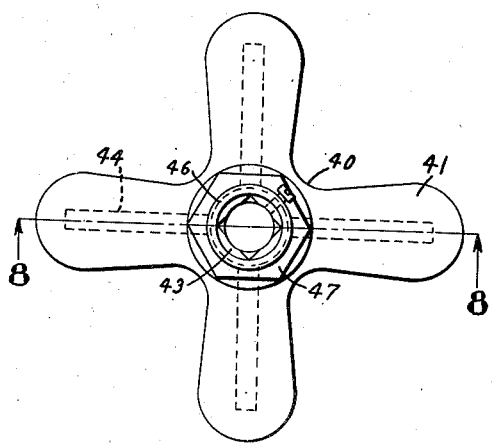
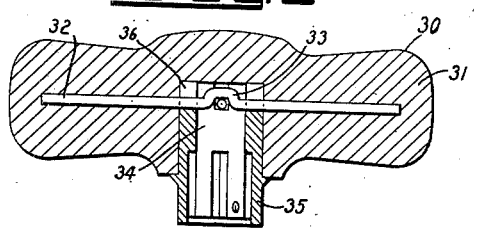
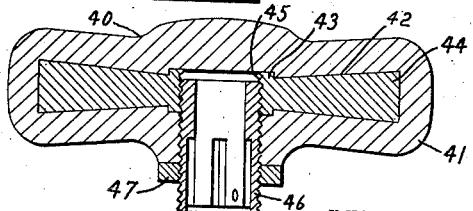
INVENTOR.
H. E. DICK
BY
ATTORNEY.

Patented Nov. 1, 1938

2,134,812

UNITED STATES PATENT OFFICE 2,134,812

VALVE HANDLE

Herman E. Dick, Chicago, Ill.

Application March 12, 1937, Serial No. 130,516

1 Claim. (Cl. 16—117)

This invention relates to valve handles.

The general object of the invention is to provide an improved ceramic valve handle which is of pleasing appearance and is sanitary and which is reinforced to prevent breakage and resultant injury to the user.

In valve handles heretofore in use and with which I am familiar the handle members have been integrally formed of ceramic or vitrified material and frequently these handles have broken while being operated thus resulting in injury to the user, and my invention seeks to overcome this liability of breakage and its consequent injurious effects.

A specific object of the invention is to provide a ceramic valve handle wherein a reinforcing member is built into the handle.

Another object of the invention is to provide a valve handle including a body made of ceramic material and having projecting arms and wherein a sleeve is arranged in the body with the sleeve provided with integral reinforcing members for reinforcing the arms.

Other objects and the advantages of my invention will be apparent from the following description taken in connection with the accompanying drawing, wherein:

Fig. 1 is a bottom plan view of a valve handle embodying the features of my invention;

Fig. 2 is a sectional view taken on line 2—2 Fig. 1;

Fig. 3 is a top plan view showing a modification of my invention;

Fig. 4 is a section taken on line 4—4 Fig. 3 with a part of the projecting portion in elevation;

Fig. 5 is a top plan view with parts broken away showing a further modification of my invention;

Fig. 6 is a section taken on line 6—6 Fig. 5;

Fig. 7 is a view similar to Fig. 1 showing another modification; and

Fig. 8 is a section taken on line 8—8 Fig. 7.

Referring to the drawing by reference characters I have shown my invention as embodied in a valve handle which is indicated generally at 10. This handle is preferably made of ceramic or vitrified material and is preferably of one piece and includes a body part 11 and a plurality of projecting arms 12 which are arranged in cruciform shape and which are suitably rounded for engagement with the fingers of the user.

Within the body 11 I provide a socket member 13 which includes a central sleeve 14 and a plurality of radially directed arms 15. These arms may be of suitable configuration and as shown they are generally rectangular in cross section. The arms preferably taper being broader at the outer end to prevent slippage of the reinforcement relative to the body.

The sleeve 13 is provided with a central bore 15' and with kerfs 16 so that a rectangular valve stem may be received within the recess and may be held by a suitable set screw 17.

In use the valve handle is mounted in the usual way and is turned to open and close the valve. Due to the reinforcement the liability of breakage of the handle is reduced. Also should by any chance breakage occur, it will merely cause a fracture and the fractured part will not drop away so that no sharp edges will be produced.

In Figs. 3 and 4 I show a modification of my invention wherein the single lever type of handle is indicated generally at 20. As shown this valve handle includes a body 21 having a recess 22 therein by means of which the body may be engaged upon the valve stem. The body is also provided with an aperture 23 through which a screw may be passed to hold the handle on the valve stem. The body 21 in this case is preferably made of metal and includes a projecting integral metal handle 24 which is completely covered with a ceramic or vitrous cover 25 to provide a sanitary operating portion.

In Figs. 5 and 6 the body 30 of the handle includes radiating arms 31 and within these arms I show a pair of crossed wires 32. These wires intersect as at 33 within a recess 34. Also mounted on this recess 34 I show a sleeve 35 which includes notches 36 engaging the wires and thus preventing rotation of the sleeve member relative to the wires. The sleeve member 35 is adapted to receive a valve stem and to be secured thereto. The sleeve member may be secured in place by suitable cement or other material.

In Figs. 7 and 8 the body 40 is provided with arms 41 and with a reinforcing member 42 which is of cruciform shape and includes a central collar 43 and arms 44. This collar 43 is threaded internally as at 45 to engage threads on a sleeve 46 which is also engaged by a lock nut 47 to hold the parts assembled. The sleeve 46 receives a valve stem and is secured thereon.

From the foregoing description it will be apparent that I have invented a novel valve handle which can be economically manufactured and which is safe in use.

Having thus described my invention I claim:

A valve handle including a body having radially extending hand engaging members thereon, a plurality of wires arranged in said body and intersecting at the center thereof, said body having an open ended recess therein, said wires crossing within said recess, a sleeve in said recess, said sleeve having notches thereon engaging said wires to prevent relative rotation between the sleeve and wires, and means on the sleeve to engage a valve stem.

HERMAN E. DICK.